(12) United States Patent
Cudak et al.

(10) Patent No.: US 7,643,832 B2
(45) Date of Patent: Jan. 5, 2010

(54) METHOD AND APPARATUS FOR REFERENCE SIGNAL SELECTION IN A CELLULAR SYSTEM

(75) Inventors: Mark C. Cudak, Rolling Meadows, IL (US); Kevin L. Baum, Rolling Meadows, IL (US); Frederick W. Vook, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/150,953

(22) Filed: Jun. 13, 2005

(65) Prior Publication Data

US 2006/0009227 A1   Jan. 12, 2006

Related U.S. Application Data

(60) Provisional application No. 60/587,111, filed on Jul. 12, 2004.

(51) Int. Cl.
G06F 15/16 (2006.01)
(52) U.S. Cl. ...................................... 455/450; 455/436
(58) Field of Classification Search ................ 455/436, 455/439, 450, 451, 452.1; 370/331, 335
See application file for complete search history.

(56) References Cited

U.S. PATENT DOCUMENTS 6,018,667 A   1/2000   Ghosh et al.

2004/0116142 A1*   6/2004   Wang et al. .................. 455/522
2004/0131029 A1*   7/2004   Tobe et al. .................... 370/331
2004/0257979 A1*   12/2004   Ro et al. ....................... 370/208
2005/0130692 A1*   6/2005   Furukawa et al. ........... 455/522

OTHER PUBLICATIONS

IEEE C802.16e-04/103r2, IEEE 802.16 Broadband Wireless Access Working Group <http://ieee802.org/16>, Signaling Methodologies to Support Closed-Loop Transmit Processing in TDD-OFDMA, Frederick W. Vook, Xiangyang (Jeff) Zhuang, Kevin L. Baum, Timothy A. Thomas, Mark Cudak, Jul. 7, 2004, pp. 0-34.
IEEE C802.16e-04/143r1 (IEEE C802.16e-04/143), IEEE 802.16 Broadband Wireless Access Working Group <http://ieee802.org/16, Ranging Improvement for 802.16e OFDMA PHY, Xiangyang (Jeff) Zhuang, Kevin Baum, Vijay Nangia, Mark Cudak, Jul. 7, 2004, pp. 0-42.

* cited by examiner

*Primary Examiner*—Sam Bhattacharya

(57) ABSTRACT

In a wireless communication system, a method and apparatus for reference signal selection is disclosed. In accordance with the preferred embodiment of the present invention, a first reference signal in a first cell is pseudo-randomly selected from a predetermined limited set of reference signals for transmission on a first channel resource. A second reference signal in the cell is pseudo-randomly selected from the predetermined limited set of reference signals for transmission on a second channel resource, where the predetermined limited set of reference signals is common among the first cell and at least a second cell.

19 Claims, 5 Drawing Sheets

100

200

400

300

500

METHOD AND APPARATUS FOR REFERENCE SIGNAL SELECTION IN A CELLULAR SYSTEM

FIELD OF THE INVENTION

The present invention relates generally to communication systems, and in particular, to a method and apparatus for reference signal selection in a cellular system.

BACKGROUND OF THE INVENTION

In a cellular communication system, a large geographic area is divided into multiple cells. Physical resources—such as frequency channels, spreading codes, timeslots etc.—are re-used from cell-to-cell to maximize system capacity. Within a cell, a single base station communicates with a subset of the mobiles. These mobiles are assigned to cells by handoff algorithms that direct the mobile to the most appropriate cell. Once a cell has been selected, communications are generally considered to be confined within the cells boundaries and protocols are defined for point-to-multi-point communication between one base and the sub-set of mobiles.

Practically, radio communications are not confined by the cells geographic boundaries and cross-cell communication occurs where a base station may communicate with mobiles in adjacent (or more distance) cells. Cross-cell communication can be problematic for a number of reasons:
  Cell Selection—a mobile must select the most appropriate cell and then retain connection to that cell. Therefore a mobile must be able to distinguish between signals received from multiple cells and uniquely identify the most appropriate cell.
  Association—once selecting an appropriate cell the mobile must clearly associate itself with that cell. As a result, the mobile must transmit a signal that allows a base station receiving these signals to differentiate between a signal that is intended for it or another base station.
  Protocol Consistency—as stated protocols are defined for a single base station and a sub-set of mobiles. Cross-cell communication can often intermingle the transmissions of several mobiles, associated with different cells, resulting in a protocol error. For example, the address space used to communicate with the sub-set of mobiles is re-used for cell-to-cell. Therefore, directives intended for one mobile may be interpreted by another mobile in an adjacent cell.

To overcome the problems of cross-cell communication, many methods are used to distinguish cell sites. For some systems, geographic frequency re-use is partitioned in such a way that geographically close cells do not use the same frequency alleviating much of the cross-cell communication problems. For systems employing a large frequency re-use pattern, simple means are appropriate to distinguishing between cells such as a transmission of a cell-specific reference signal (e.g., base station ID field). However, for more aggressive re-use patterns cross-cell communications must employ alternate techniques to identify base stations and mobiles. Therefore a need exists for a method and apparatus for choosing reference signals to be transmitted in a communication system that employs a more-aggressive frequency re-use pattern.

DETAILED DESCRIPTION OF THE DRAWINGS

Figure 1:
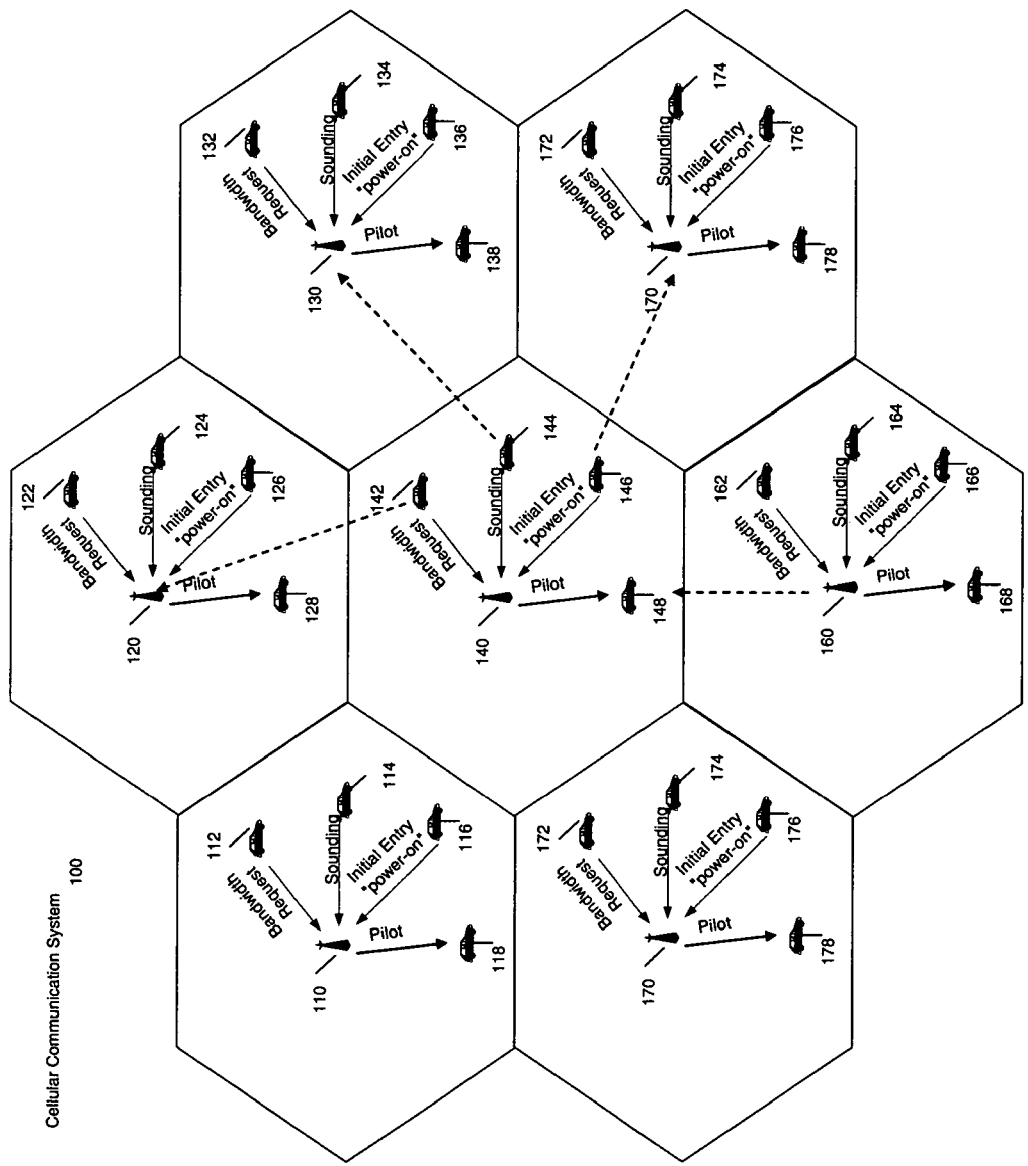
FIG. 1 is a block diagram of a cellular communication system.

In order to address the above-mentioned need, a method and apparatus for reference-signal selection is provided herein. Particularly, unique sequences are used to help differentiate between cells that use the same frequency but are geographically close. These unique sequences, called codewords, are part of code sets having favorable properties which aid the detection of desired signals and foster the rejection of undesired signals. During operation, transmitters will choose a particular reference signal from a first set of available reference signals. This particular reference signal will be utilized for a predetermined period of time, after which, the transmitter will choose a second reference signal from the first set of available reference signals to be utilized for a predetermined time period.

Code sets can be used to distinguish base stations and mobiles associated with a particular cell. A codeword within this set may be assigned to a base station as pilot or pre-amble signal. Similarly, a set of codewords may be assigned cell for use by the sub-set of mobiles assigned to the cell. During the cell selection process, a mobile would be able to uniquely identify a base station by the correlating with the desired code. Likewise, mobiles will use codes to uniquely identify which base station their communication is intended.

The present invention encompasses a method for selecting a reference signal to be transmitted by a cell of a multi-cell wireless communication system. The method comprises the steps of selecting, by the cell, a first reference signal from a predetermined limited set of reference signals for transmission on a first channel resource, transmitting the first reference signal on the first channel resource, and selecting, by the cell, a second reference signal from the predetermined limited set of reference signals for transmission on a second channel resource. The second reference signal is then transmitted on the second channel resource.

The present invention additionally encompasses a method for selecting a reference signal to be transmitted of a multi-cell wireless communication system. The method comprises the steps of at a first time, selecting, a first reference signal from a first set of reference signals for transmission on a first channel resource, transmitting the first reference signal on the first channel resource, and at a later time, selecting, a second reference signal from a second set of reference signals for transmission on a second channel resource. The second reference signal is then transmitted on the second channel resource.

The present invention additionally encompasses an apparatus comprising a reference signal selection unit outputting a first reference signal from a predetermined limited set of reference signals for transmission on a first channel resource, and outputting a second reference signal from the predetermined limited set of reference signals for transmission on a second channel resource. A transmitter unit is provided transmitting the first reference signal on the first channel resource and transmitting the second reference signal on the second channel resource.

Turning now to the drawings, wherein like numerals designate like components, FIG. 1 is a block diagram of cellular communication system 100. Communication system 100 comprises a seven cell system having base stations 110, 120, 130, 140, 150, 160 and 170. Each base station serves a subset of mobiles. Base station 110 serves mobiles 112, 114, 116 and 118. Base station 120 serves mobiles 122, 124, 126 and 128. Base station 130 serves mobiles 132, 134, 136 and 138. Base station 140 serves mobiles 142, 144, 146 and 148. Base station 150 serves mobiles 152, 154, 156 and 158. Base station 160 serves mobiles 162, 164, 166 and 168. Base station 170 serves mobiles 172, 174, 176 and 178. Each mobile in the base station will communicate with the base station within its cell. For example, mobile 142 is requesting bandwidth from base station 140; mobile 144 is sending a channel sounding signal to base station 140; mobile 144 is sending an initial access request to base station 140; and mobile 148 is acquiring base station 140 by detecting it's pilot signal. As discussed, cross cell communication may occur between mobiles in base station 140's cell and the adjacent cells. For example, base station 120 may receive mobile 142's bandwidth request; base station 130 may receive mobile 144's channel sounding signal; base station 170 may receive mobile 146's initial access request; and mobile 148 may receive base station 160's pilot signal.

Figure 2:
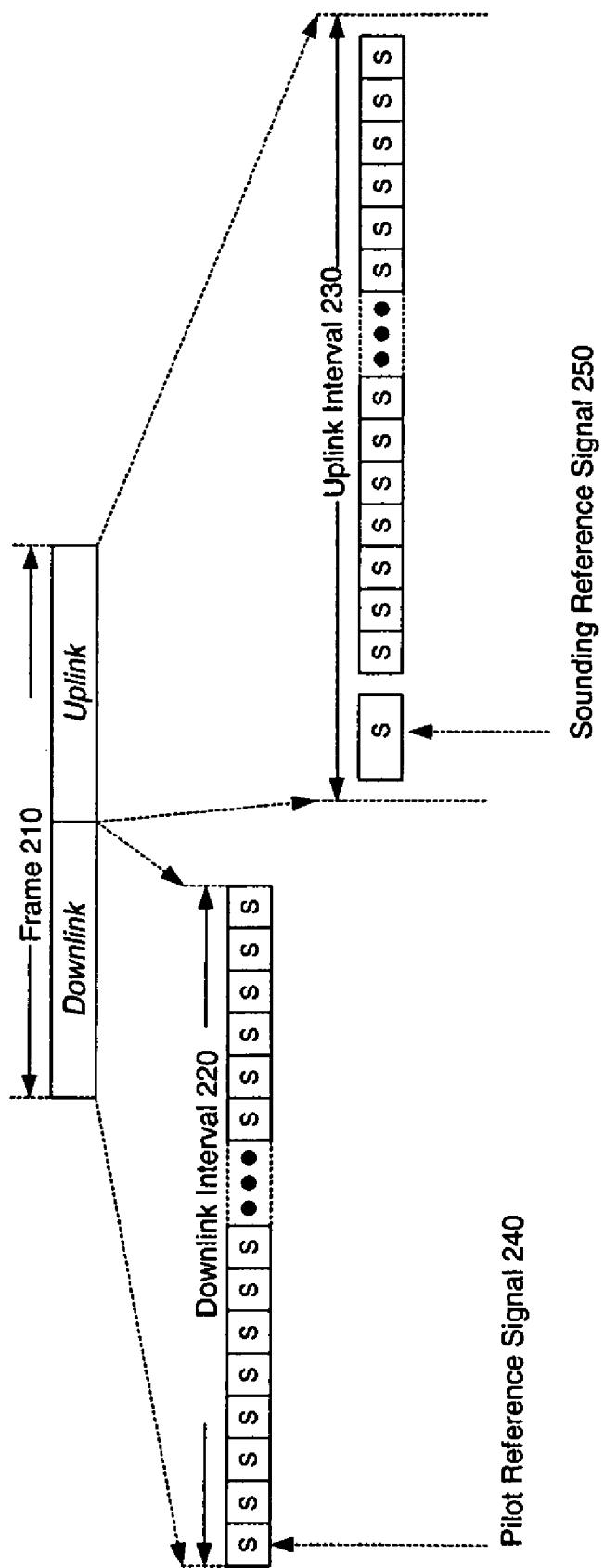
FIG. 2 shows an example frame structure that can be used by the cellular communication system.

FIG. 2 shows frame structure 200 used by the cellular communication system 100. For Time Division Duplex (TDD), the frame is divided into a downlink interval (220) and an uplink interval (230). Each interval may be composed of a number modulation symbols. These symbols could be Orthogonal Frequency Division Multiplex signals or other modulation methods. In fact, they can be a mix of modulation symbols. One of these symbols in downlink interval might be used as base station pilot signal 240. In addition, one of these symbols on the uplink may be used as an initial access signal or channel sounding signal 250.

In cellular communication systems, there are several examples of functions that employ reference signal sequences. An example is a synchronization function that synchronizes multiple communication units in time and/or frequency to a common reference. Another example is a channel estimation function for use by a receiver for coherent receiver processing and demodulation. Yet another example is the system acquisition function whereby a cellular base station (BS) transmits a reference signal to assist a subscriber station (SS) in the initial process of joining the cell. Still another example is the practice of a SS transmitting a reference signal to the BS in a Time Division Duplexing (TDD) system for the purpose of enabling the BS to determine the downlink (DL) channel response for the purpose of employing coherent transmit antenna array processing on the DL.

Cellular systems generally employ a set or series of reference signals or reference signal sequences that are transmitted during one or more resource intervals within the physical transmission resources (e.g., time, frequency, code) of the communication system. The set or series of reference signals is generally chosen to have one or more of the following desirable properties: auto-correlation properties, cross-correlation properties, peak-to-average power ratio properties Cellular systems generally have a need to assign one or more reference signals to a particular transmitter in one cell while assigning different reference signals to transmitters in nearby cells to prevent cross-cell communication. One solution to this problem is to pre-plan upon construction of the cellular system which cells will use which subset of reference signals. This solution is undesirable because this type of cell planning adds to the overall cost of the cellular system.

When cell planning is not employed to pre-determine the reference signal assignments, the problem of assigning a reference signal to a particular transmitter becomes an especially difficult problem in situations where the total number of possible sequences is small or limited. For example, the number of available sequences is generally equal to the sequence length, which is generally determined by the available transmission resources (time/frequency/code) assigned for reference signal transmission. In such cases, the probability of two communication units being assigned the same sequence is high enough to seriously degrade the performance of the system functions that exploit reference signal transmissions. In this case, if communication units continually used the same reference signals indefinitely, then a collision in reference signal assignments will continue to occur indefinitely. As a result, it is particularly critical for communication units to change their reference signals over time so that if a collision occurs in one transmission resource interval, then a collision will not keep occurring over and over again.

In the preferred embodiment of the present invention assignment of one or more reference signals to communication units (e.g., BS or SS) within a cellular system occurs in a pseudo-random manner that requires no real-time coordination between the cells. The solution employed by the present invention also avoids the need to coordinate or plan upon system construction which cells or transmitters will employ which reference signals.

Given the pseudo-random method used for selecting the reference signals, collisions can occur whereby a communication unit in one cell transmits with the same reference signal or signals as transmitted by a communication unit in the same or a different cell. When a collision occurs, the performance of the function employing the reference signal is generally degraded from the performance when no collision occurred. As a result, it is desirable to minimize the likelihood of a collision (i.e., the likelihood that two communication units will use the same reference signal). It is also desirable to minimize the likelihood of subsequent collisions given that a collision has occurred.

Operation of communication system 100 occurs by first predetermining a set of reference signals having properties desirable for enabling various functions in a cellular communication system. One embodiment of the present invention uses the Generalized Chirp-Like (GCL) sequences, which are known for their excellent auto-correlation and cross-correlation properties. When the communication system is operating and a reference signal needs to be transmitted in one or more transmission resource intervals, the invention selects one or more reference signals from the predetermined limited set of reference signals for use by communication units according to a pseudo-random process that has the following characteristics. First the reference signal assigned to a particular communication unit changes from one resource interval to the next in a pseudo-random fashion. Second, different communication units are assigned reference signals by means of different pseudo-random processes, so as to minimize not only the likelihood of a collision, but also to minimize the likelihood that collisions are repeated in subsequent resource intervals. (This aspect of the invention minimizes the persistence of the use, by two communication units, of a same reference signal selected by the communication units from a limited set of reference signals.) As a result, over time, collisions are not persistent and are not continual over time, and the interference from a reference signal assignment collision becomes effectively randomized over the plurality of transmission resources (i.e., over time/frequency, etc.) The pseudo-random process is easily determined by the transmitting and receiving communication units based on pre-determined rules. As a result, no real-time coordination between cells is required in the process of assigning reference signals.

In general, the receiving unit knows the total available set of reference signals that could be used during the reserved physical transmission resources. However, to ease the implementation requirements on the receiving unit, it is advantageous to limit the actual number of reference signals that could be transmitted during the reserved physical layer transmission resources to a much smaller subset of the entire set of possible reference signals. Limiting the actual number of reference signals that can be assigned to a particular set of reserved physical transmission resources means the receiver processing need only consider the limited number of reference signals rather than the entire set, which can reduce complexity considerably. Therefore, a method is required for assigning a subset of the total set of available reference signals to the one or more communication units to choose from when transmitting during the physical transmission resources reserved for reference signal transmission. The invention provides a method of assigning to one or more communication units a subset of sequences that can be chosen from for transmission during the transmission resource intervals in which reference signals are transmitted.

Ranging or timing-advance functions are examples of system functions that can exploit the practice of partitioning the total available set of reference signals into subsets. In such a function for example each cell is assigned a subset of reference signals and the communication units within the cell will pseudo-randomly transmit one of the reference signals belonging to the subset of reference signals assigned to the cell to which the communication units belong. In such an application the receiving unit (the BS in this case) searches for all reference signals belonging to its reference signal subset. In this case it is desirable to minimize both the probability that two cells employ the same reference signal subset and also the probability that two communication units (SSs in this case) within the same cell pick the same reference signal within the reference signal subset to which they are assigned.

In some cases, the invention partitions the predetermined set of reference signals into subsets according to their relative quality measure according to some known criteria. For example, reference signals could be grouped according to their peak-to-average power ratio (PAPR). One subset could then consist of the set of all reference signals having a low PAPR relative to the other reference signals. As another example, reference signals could be grouped into subsets according to their auto-correlation properties. As a third example, reference signals could be grouped into subsets where all reference signals in the subset have good cross-correlation properties. In an embodiment of the present invention incorporates a strategy for allocating to one or more communication units a subset of the total set of available reference signals for possible use during the resource interval devoted to reference signal transmission.

Other techniques for reference signal generation and assignment are described in U.S. patent applications Ser. Nos. 10/813,476 and 11/070,061, assigned to the assignee of the present invention and incorporated by reference herein.

GCL Sequences as Reference Signals

In one embodiment of the invention, the reference signals are chosen to be the Generalized Chirp-Like (GCL) waveforms, which are non-binary unit-amplitude sequences. (Other embodiments of the invention employ other types of reference signals.) A GCL sequence is expressed as $$s_u(k) = \exp\left\{-j2\pi u \frac{k(k+1)}{2N_G}\right\}, \quad (1)$$

$$k = 0 \cdots N_G - 1 \text{ and } u(\text{"class index"}) = 1 \cdots N_G - 1$$

where $N_G$ is the length of a GCL sequence (chosen as a prime number as explained below) and u is referred as the class index that is a non-zero integer chosen between 1 and $N_G$. For different sequence lengths, there are a number of GCL sequences that can be used, which makes them an ideal choice for the use as reference signals. The GCL sequence has the following important properties:

Property 1: The GCL sequence has constant amplitude, and its $N_G$-point DFT has also constant amplitude.

Property 2: The GCL sequences of any length have an "ideal" cyclic autocorrelation (i.e., the correlation with the circularly shifted version of itself is a delta function)

Property 3: The absolute value of the cyclic cross-correlation function between any two GCL sequences is constant and equal to $1/\sqrt{N_G}$, when |u1−u2|, u1, and u2 are relatively prime to $N_G$.

The cross-correlation $1/\sqrt{N_G}$ at all shifts (Property 3) is actually the minimum achievable value for any two sequences that have the ideal autocorrelation property (i.e., the maximum value of the cross-correlation at all shifts is minimized which is equal to $1/\sqrt{N_G}$). This property is important when a number of potential interfering sequences are received, either in a single sector or in a multi-sector environment. The cross correlation property provides some suppression of the interfering signals during a channel estimation process for example. Hence, the channel of the desired transmitter can be detected more reliably.

Determining the Set of Available Reference Signals for Use in a Cellular System

Once the type of reference signal is chosen for the particular application, the complete set of available sequences must be identified. In the embodiment of the invention that uses GCL sequences, the length of the GCL sequence is first identified in order to determine the specific set of GCL sequences that are available for use by transmitters in the cellular system.

The required length of the reference signal is determined by the physical layer transmission resources (time and frequency resources) allocated for the transmission of the reference signals. For example, in a channel estimation application, specific time-frequency resources are allocated for transmitting the reference signal that is used by the receiver for channel estimation. In a synchronization application, specific time-frequency resources are allocated for transmitting the reference signal that is used by the receiver for synchronization. The resources allocated for transmitting the reference signal determine the required length of reference signal.

When using GCL sequences as reference signals, the value of $N_G$ needs to be determined once the required length is determined. In many cases, the required length of the GCL sequence is not a prime number. In this case, there are two choices: in one embodiment, $N_G$ is determined to be the smallest prime number that is larger than the desired length, and the GCL sequences computed according to (1) are then truncated to the desired length. In an alternate embodiment, $N_G$ is chosen to be the largest prime number that is smaller than the desired length, and the sequences computed according to (1) are then cyclically extended to the desired length. Note that when either modification is performed, the three properties identified above will only hold approximately, but will hold very well when the sequence is long.

For GCL sequences, once the required length L and the value of $N_G$ are determined, there will then be $N_G$ available GCL sequences for the particular application (e.g., channel estimation, synchronization). The next problem is to assign one or more of these GCL sequences to communication units in a cellular system.

Assigning Reference Signals to Transmitters in a Cellular System

Once the set of available reference signals is determined based on the physical layer transmission resources assigned for reference signal transmission, a strategy must be in place for determining which reference signal or signals is to be used for transmission on a particular set of assigned transmission resources by one or more communication units. For example, in a frame-based transmission system, a set of physical transmission resources are reserved in a plurality of successive frames for the purpose of transmitting reference signals to aid in functions such as synchronization, channel estimation, and other functions known in the art for maintaining a high quality communications link. During the reserved physical transmission resources, one or more communication units, for example, may transmit using one or more reference signals.

For GCL sequences, the range of possibilities for the parameter u in (1) directly determines the set of possible sequences available to the system. In other words, once L and $N_G$ are determined, the specific sequence is determined by choosing the value of u in (1). An embodiment of the present invention determines the value of u with a pseudo-random number generator initialized with the Base ID (also called cell identification value or CellID)) of the cell to which the communication system is associated. In other words, the reference signal is pseudo-randomly selected with a function that is initialized with a value that is unique to the first cell. Another embodiment determines the value of u with a pseudo-random number generator initialized with the combination of both the Base ID of the cell and the numeric identifier corresponding to the current frame. In other words, the pseudo-random process used to determine the specific reference signal to use is a function of the Base ID of the current cell plus some measure of the current time within the current cell (e.g., frame number, time offset, time the cell was operating, etc.) This causes each communication unit in the system to employ the same pseudo-random number generator, but each cell within the system will use a different seed value to the pseudo-random number generator, and the seed value will change from time frame to time frame. As a result, if a collision occurs in which two communication units (either within the same cell or from different cells) are assigned the same reference signal, then it is highly likely that this type of collision will not occur in subsequent resource intervals devoted to reference signal transmission.

One embodiment of the present invention leverages a pseudo-random binary sequence (PRBS) generation technique, which is an example of a function that creates pseudo-random numbers. The specific sequence to be chosen (i.e., choosing the exact value of u for equation (1) for when GCL sequences are used) is determined as a function of the output bits of the PRBS. In one embodiment, the sequence chosen is equal to one plus the decimal equivalent of the first ceil($\log_2$ (Ls)) output bits of the PRBS, where the ceil operator rounds to the next highest integer and Ls is the number of possible sequences to choose from. In this embodiment, the PRBS in this case is initialized with a bit sequence consisting of the 6 least significant bits of the CellID and the eight least significant bits of the Frame Number, which numerically identifies the frame in which the reference signal is to be transmitted. This has the benefit of assigning with high probability different GCL sequences to different BS IDs. Also the assigned GCL sequence will change pseudo-randomly from frame to frame, so that a collision in the CGL sequence assigned to different CellIDs in one frame will likely not occur in subsequent frames.

Another aspect of the invention is the selection of subsets of the total set of available reference signals and the assignment of those subsets to groups of communication units (e.g., all of the users located in a particular cell). In this case, there are two instantiations of this functionality: For the first instantiation, the total set of available reference signals is subdivided or partitioned into predetermined subsets or partitions that do not overlap, meaning that a particular reference signal belongs to one and only one subset/partition. An embodiment of this technique simply divides beforehand (i.e., in a predefined fashion) the set of predetermined limited set of reference signals into non-overlapping subsets in a manner that is known. In one alternative, the partitioning does not change with time, and in another alternative, the partitioning actually changes with time, wherein the manner in which the partitioning changes in known to both the transmitting communication unit and the receiving communication unit.

Alternatively, in the second instantiation, the total set of available reference signals are pseudo-randomly subdivided or partitioned into sets that because of the pseudo-random partitioning may or may not overlap. Furthermore, the pseudo-random partitioning in one alternative can change as a function of time in a manner that can be determined in real time by both the transmitting communication unit and the receiving communication unit. An embodiment of this functionality uses the outputs of a PRBS generator initialized with the BS ID and the frame number in order to determine the current partitioning of the total set of available reference signals. To this end, the output bits of the PRBS generator are grouped into blocks wherein the number of blocks equals the number of reference signals in the subset and each block of output bits, when converted to decimal, corresponds to one of the reference signals that belongs to the subset. The result is a random uniform selection of the reference signals that belong to the reference signal subset at any given time.

Figure 3:
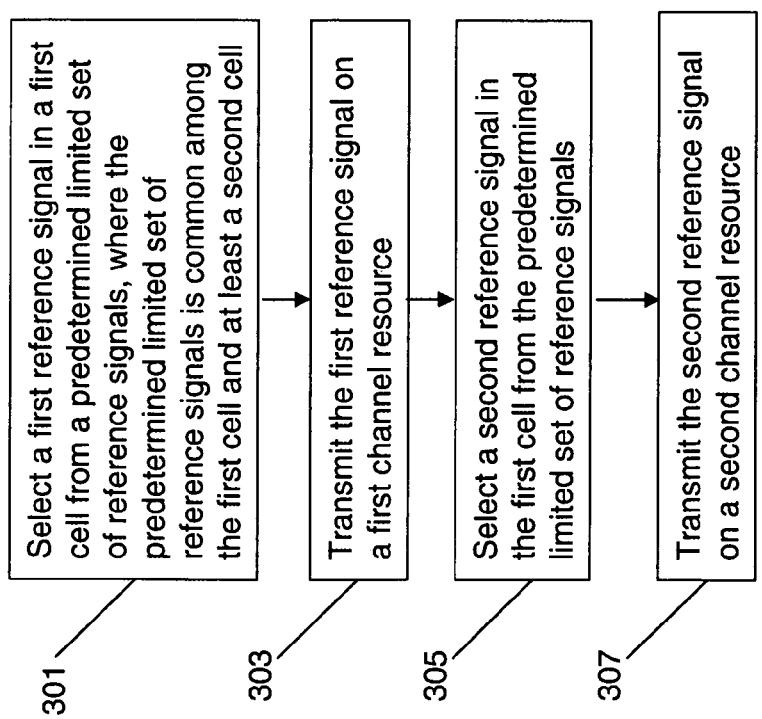
FIG. 3 is a flow chart showing reference-signal selection in accordance with a first embodiment.

Turning again to the figures, FIG. 3 is a flow chart 300 showing a method for selecting a series of reference signals in a cell of a multi-cell wireless communication system. The first step 301 selects a first reference signal in a first cell from a predetermined limited set of reference signals, where the predetermined limited set of reference signals is common among the first cell and at least a second cell. Since the set is common, the elements of the set are available for use in both the first cell and the second cell, and preferably additional cells in the system as well. The selection is preferable performed pseudo-randomly. The selected reference signal is for transmission on a first channel resource, such as a time interval in a particular frame, a set of subcarriers of a multicarrier (e.g., OFDM) system, time-frequency combinations, or other such communication resources as known in the art. The selected reference signal is transmitted in step 303. The next step 305 selects a second reference signal for the a first cell from the predetermined limited set of reference signals. The selection is preferable performed pseudo-randomly. The selected reference signal is for transmission on a second channel resource. The selected reference signal is transmitted in step 307.

It should be noted that the step of pseudo-randomly selecting in the first cell can be based on a function that is initialized with a value that is unique to the first cell. Additionally, the step of pseudo-randomly selecting can be based on a function that is initialized with a value that is based at least one of a cell identification value (e.g., CellID) and a frame number.

The reference signals in the predetermined limited set are preferably chosen based on their desirable properties for use in a wireless system, such as desirable cross correlation characteristics between different reference signals in the predetermined set (e.g., low cross correlation values), desirable autocorrelation characteristics for each reference signal in the predetermined set (e.g., close to an impulse function), or moderate peak-to-average power ratios. The reference signals can be based on GCL sequences in order to provide reference signals with desirable properties for use in a wireless system.

The selected reference signal, when transmitted, can be used to facilitate synchronization (e.g., ranging, downlink timing acquisition), or for channel estimation, or for other purposes.

Figure 4:
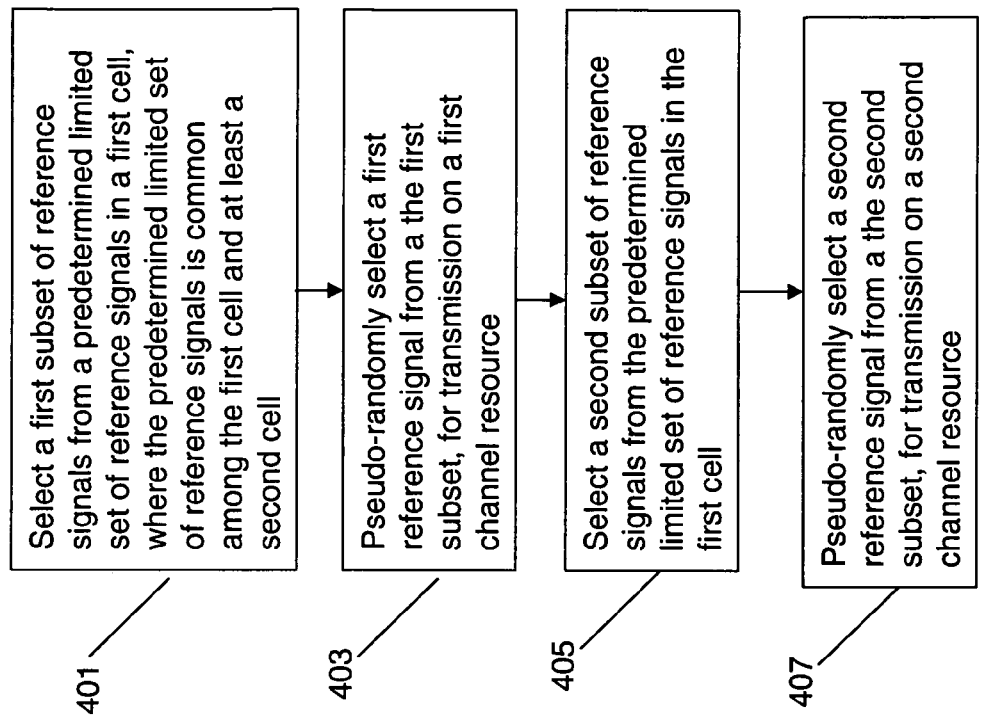
FIG. 4 is a flow chart showing reference-signal selection in accordance with a second embodiment.

FIG. 4 is a flow chart 400 showing a method for selecting reference signals in a cell of a multi-cell wireless communication system that differs from the FIG. 3 by first selecting only a subset of the predetermined limited set of reference signals and then selecting a reference signal from within the subset. This method is particularly useful for ranging or random access, where multiple remote/mobile/subscriber units need to pseudo randomly select a reference signal to transmit, and where the selection of the reference signal is made at the remote unit rather than at the base station. 401 selects a first subset of reference signals from a predetermined limited set of reference signals in a first cell, where the predetermined limited set of reference signals is common among the first cell and at least a second cell. 403 pseudo-randomly selects a first reference signal from a the first subset, for transmission on a first channel resource. 405 selects a second subset of reference signals from the predetermined limited set of reference signals in the first cell. 407 pseudo-randomly selects a second reference signal from a the second subset, for transmission on a second channel resource. In one embodiment, the selection the first subset of reference signals in the first cell is based on a function that is initialized with a value that is unique to the first cell, or can be based on a function that is initialized with a value that is based at least one of a cell identification value and a frame number.

Figure 5:
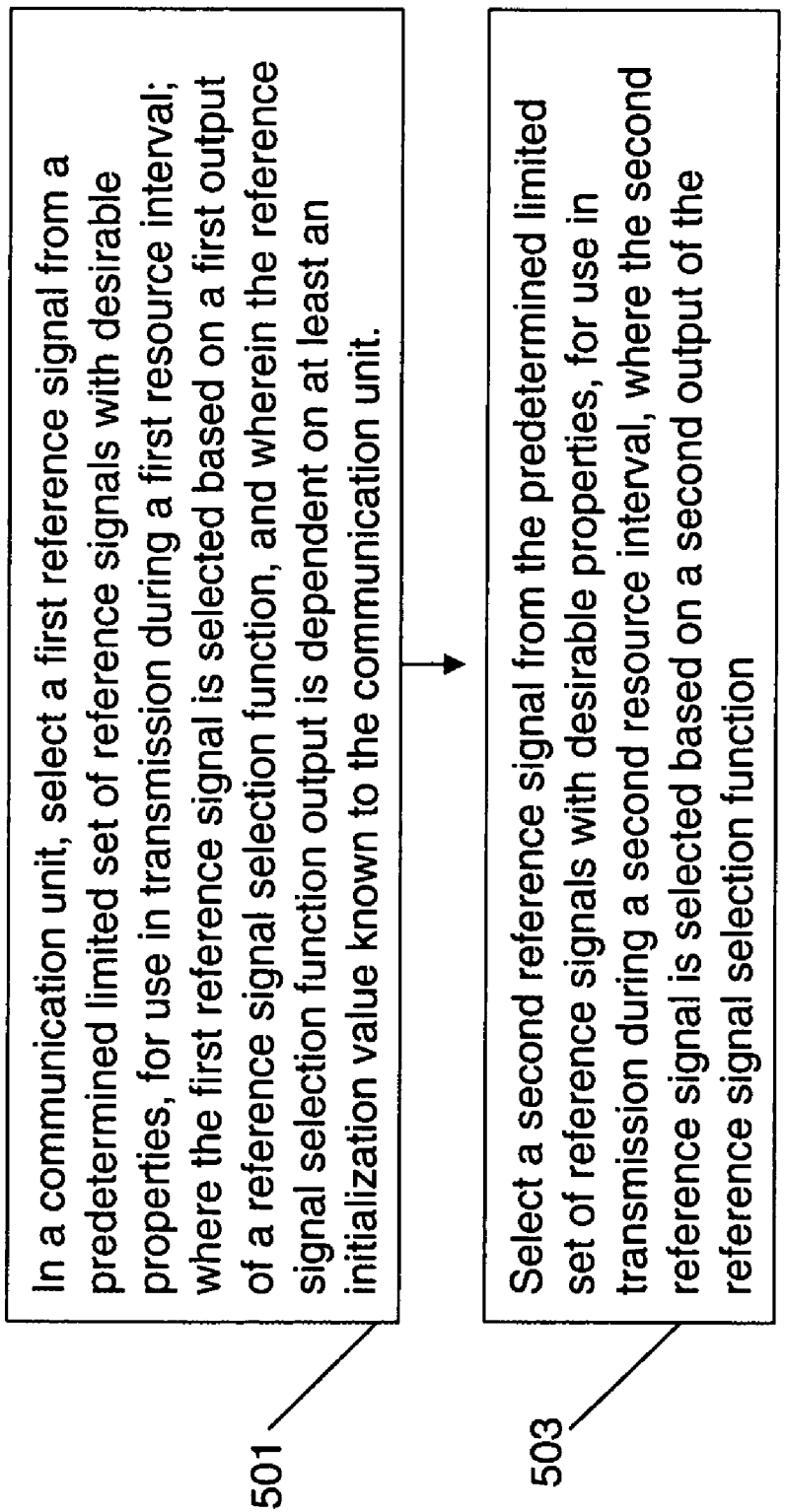
FIG. 5 is a flow chart showing reference-signal selection in accordance with a third embodiment.

FIG. 5 is a flow chart 500 showing an embodiment of the invention for reducing the persistence of the use, by two communication units, of a same reference signal selected by the communication units from a limited set of reference signals with desirable properties. For example, if two communication units have selected and are transmitting the same reference signal on the same channel resource (or resource interval), it is difficult for a receiver to distinguish between the two units. To resolve this problem, a new reference signal should be selected periodically such as every frame, or at least occasionally. In 501, a communication unit selects a first reference signal from a predetermined limited set of reference signals, preferably with desirable properties, for use in transmission during a first resource interval; where the first reference signal is selected based on a first output of a reference signal selection function (e.g., a pseudo-random function such as a PRBS), and wherein the reference signal selection function output is dependent on at least an initialization value (e.g., CellID) known to the communication unit. In 503, the communication unit selects a second reference signal from the predetermined limited set of reference signals with desirable properties, for use in transmission during a second resource interval, where the second reference signal is selected based on a second output of the reference signal selection function.

Figure 6:
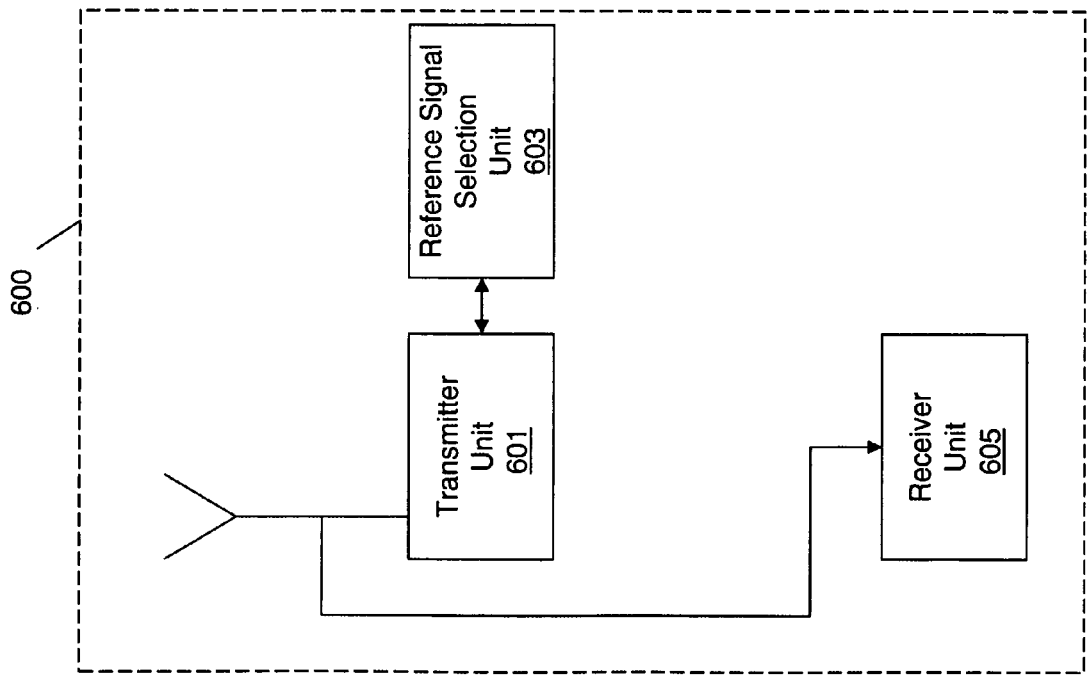
FIG. 6 is a block diagram of a communication unit in accordance with one embodiment of the invention.

FIG. 6 is a block diagram of communication unit 600 that selects and transmits a series of reference signals in a cell of a multi-cell wireless communication system, in accordance with some embodiments of the present invention. A reference signal selection unit 603, selects a first reference signal from a predetermined limited set of reference signals, and selects a second reference signal the predetermined limited set of reference signals, where the selections are preferably based on a pseudo-random function. The reference signal selection unit 603 is operably coupled to a transmitter unit 601 that transmits the first reference signal on a first channel resource, and transmits the second reference signal on a second channel resource.

In another embodiment, the reference signal selection unit 603 selects a first subset of reference signals from a predetermined limited set of reference signals, and selects a second subset of reference signals from the predetermined limited set of reference signals; and selects a first reference signal from a the first subset prefer, and selects a second reference signal from a the second subset, where the selections are preferably based on a pseudo-random function. The reference signal selection unit 603 is operably coupled to a transmitter unit 601 that transmits the first reference signal on a first channel resource, and transmits the second reference signal on a second channel resource.

Figure 7:
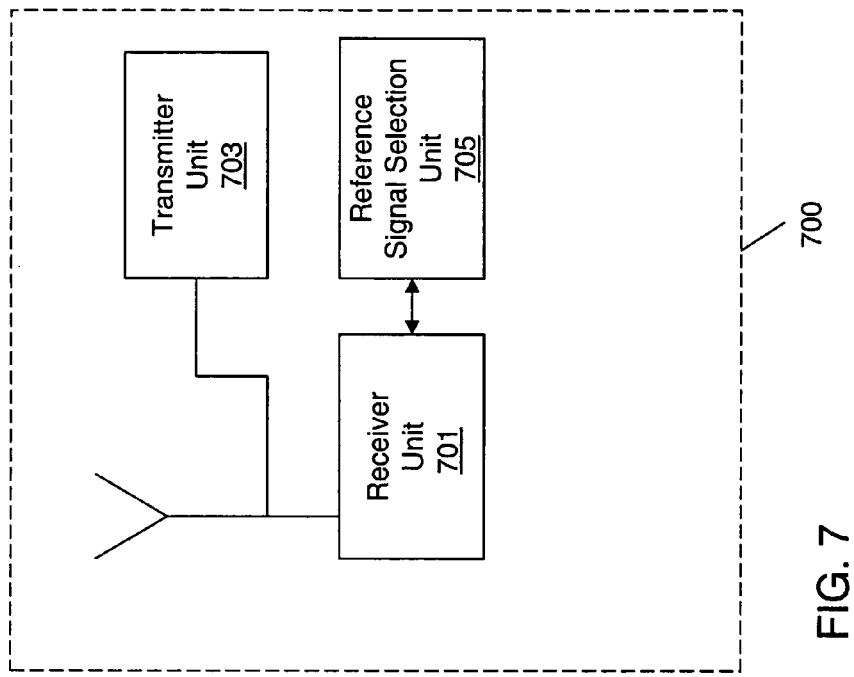
FIG. 7 is a block diagram of a communication unit in accordance with one embodiment of the invention.

FIG. 7 is a block diagram of communication unit 700 that receives reference signals in a cell of a multi-cell wireless communication system, in accordance with some embodiments of the present invention. In one embodiment, a reference signal selection unit 705 selects a first reference signal from a predetermined limited set of reference signals, and selects a second reference signal the predetermined limited set of reference signals, where the selections are preferably based on a pseudo-random function that is common with another communication unit such as unit 600. The reference signal selection unit 705 is operably coupled to a receiver unit 701, which receives a first signal on a first channel resource and for analyzes the first received signal relative to the first reference signal to provide at least one of synchronization and channel estimation information, and for receives a second signal on a second channel resource and for analyzes the second received signal relative to the second reference signal to provide at least one of synchronization and channel estimation information.

While specific embodiments of the present invention have been shown and described, it will apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

We claim:

1. A method for a remote unit to select reference signals to be transmitted by the remote unit, the method comprising the steps of:

selecting a first reference signal from a predetermined limited set of reference signals;

transmitting by the remote unit the first reference signal on a first channel resource;

selecting a second reference signal from the predetermined limited set of reference signals; and transmitting by the remote unit the second reference signal on a second channel resource;

wherein the first and the second reference signals are utilized for channel estimation, channel sounding, or system access;

wherein the step of selecting comprise the steps of pseudo-randomly selecting in a manner that is known to a target receiver of the transmissions.

2. The method of claim 1, wherein the step of selecting the second reference signal is based on predetermined process known by the remote unit and known by a target receiver of the transmissions.

3. The method of claim 2, wherein the predetermined process comprises a pseudo-random process based on an ID associated with the target receiver.

4. The method of claim 1, wherein the predetermined limited set of reference signals comprises a plurality of reference signals with a predetermined peak-to-average power ratio property.

5. The method of claim 1 wherein the predetermined limited set of reference signals comprises a plurality of reference signals with a predetermined cross correlation property.

6. The method of claim 1, wherein the predetermined limited set of reference signals comprises at least one reference signal based on a truncated or cyclically extended generalized chirp-like sequence.

7. The method of claim 1 wherein there exist a plurality of subsets of the predetermined limited set of reference signals, and wherein both the first and second reference signals are selected from a same subset.

8. The method of claim 1 wherein there exist a plurality of subsets of the predetermined limited set of reference signals, and wherein the first reference signal is selected from a first subset and the second reference signal is selected from a second subset.

9. The method of claim 1 wherein there exists a predetermined time period between the transmitting of the first and second reference signals.

10. The method of claim 1 further comprising the steps of:
selecting a reference signal from the predetermined limited set of reference signals for transmission by a second remote unit; and
transmitting by the second remote unit the reference signal on the first channel resource;
wherein the remote unit is associated with a first cell, the second remote unit is associated with a second cell, and the second cell utilizes a same RF channel as the first cell.

11. The method of claim 1 wherein the first reference signal is a channel estimation reference signal.

12. The method of claim 1 wherein the second reference signal is a channel sounding reference signal.

13. The method of claim 1 wherein the first reference signal is a random access signal.

14. A method for selecting reference signals to be transmitted by a base station, the method comprising the steps of:
selecting by the base station a first reference signal from a predetermined limited set of reference signals;
transmitting by the base station the first reference signal on a first channel resource;
selecting by the base station a second reference signal from the predetermined limited set of reference signals;
transmitting by the base station the second reference signal on a second channel resource;
wherein there is a predetermined time period between the transmitting of the first and second reference signals;
wherein the step of selecting the second reference signal is based on predetermined pseudo-random selection process; and
wherein the first and the second reference signals are utilized for channel estimation, channel sounding, or system access.

15. The method of claim 14 wherein the first reference signal is a downlink channel estimation signal.

16. The method of claim 14 wherein the first reference signal is a cell identification signal.

17. The method of claim 14 further comprising the steps of:
selecting by a second base station, a reference signal from the predetermined limited set of reference signals; and
transmitting by the second base station the reference signal on the first channel resource, wherein the step of selecting the reference signal by the second base station is based on second pseudo-random selection process.

18. The method of claim 14 where the predetermined pseudo-random selection process is based on a cell ID of the base station.

19. An apparatus comprising:
a reference signal selection unit, for pseudo-randomly selecting a first reference signal from a predetermined limited set of reference signals, and for pseudo-randomly selecting a second reference signal from the predetermined limited set of reference signals; and
a receiver unit, coupled to the reference signal selection unit, for receiving a first signal on a first channel resource and for analyzing the first received signal relative to the first reference signal to provide at least one of synchronization or channel estimation information, and for receiving a second signal on a second channel resource and for analyzing the second received signal relative to the second reference signal to provide at least one of synchronization or channel estimation information.

* * * * *